Oct. 13, 1942.    G. F. ALDINGER    2,298,329
REEL MOUNTING
Filed Nov. 15, 1940
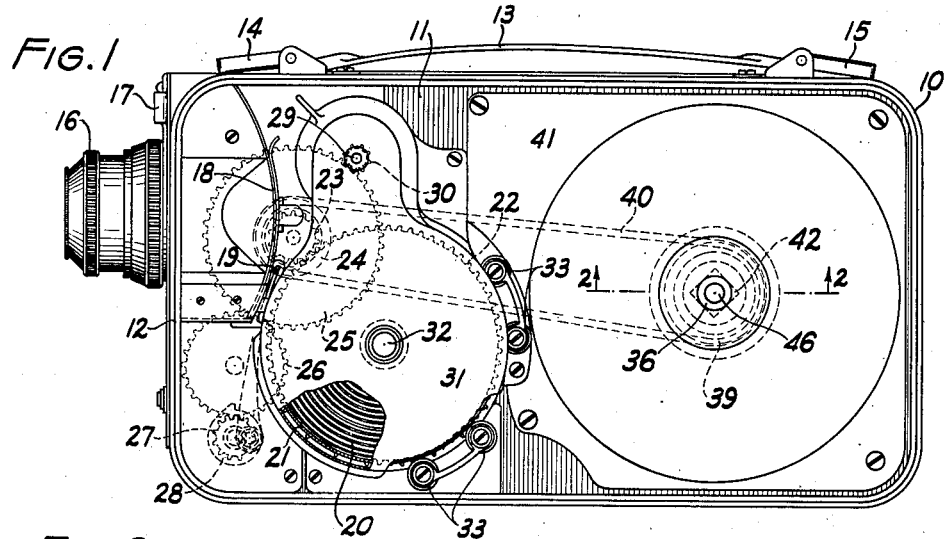
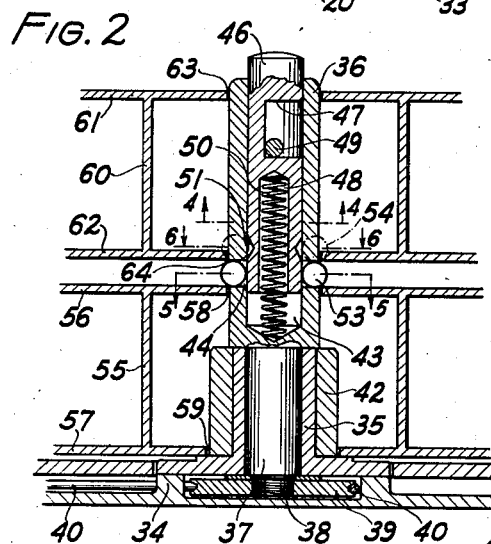
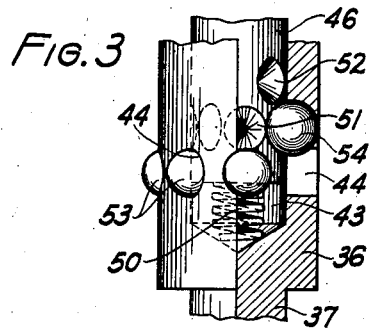
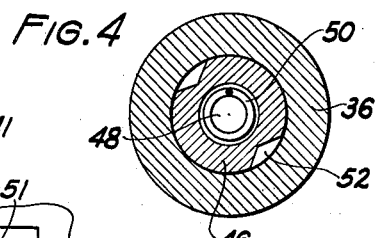
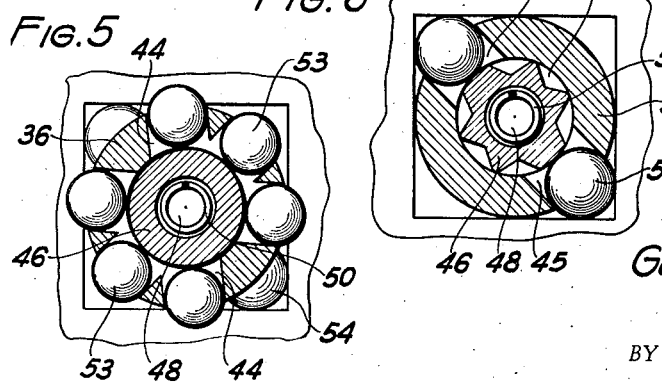
GUSTAVE F. ALDINGER
INVENTOR
BY
ATTORNEYS Patented Oct. 13, 1942

2,298,329

UNITED STATES PATENT OFFICE 2,298,329

REEL MOUNTING

Gustave F. Aldinger, Rochester, N. Y., assignor to Eastman Kodak Company, Rochester, N. Y., a corporation of New Jersey Application November 15, 1940, Serial No. 365,776

4 Claims. (Cl. 242—70)

The present invention relates to a reel mounting and more particularly to a mounting for supporting a pair of flanged reels in coaxial relationship.

While it is well known that flanged reels may be coaxially supported on a spindle member and various arrangements have already been proposed for driving engagement to one of the reels but permitting ready removal of both of them, such known constructions are open to at least one of several objections in that reel positioning or removal is awkward, manipulation of the reel engaging and/or reel separating means is difficult, or the spindle construction is complicated and expensive.

The primary object of the present invention is the provision of a reel mounting in which ball members protrude from the spindle for reel engagement but may be readily retracted for reel removal.

Another object of the invention is the provision of a reel mounting for coaxial reels in which two series of ball members respectively protrude from the spindle member for separating the reels and for driving engagement to one of them, all of said ball members receding into the spindle member upon axial operation of a plunger to permit convenient and rapid removal of the reels.

A further object of the invention is the provision of a reel mounting, ball members protruding therefrom for reel engagement, a spring pressed plunger normally urging said ball members to protrude from the spindle but provided with recesses brought opposite the ball members by operation of the plunger to permit said ball members to recede into the spindle for reel removal.

Other and further objects of the invention will be apparent to those skilled in the art from the following disclosure.

Reference is hereby made to the accompanying drawing wherein similar reference characters designate similar elements and wherein:

Fig. 1 is a side elevation of a motion picture camera equipped with the reel mounting of the invention.

Fig. 2 is a cross section through the reel mounting taken on the line 2—2 of Fig. 1.

Fig. 3 is a fragmentary side elevation in partial section of the spindle member and plunger therein.

Figs. 4, 5 and 6 are all horizontal sections through the reel mounting taken respectively on the lines 4—4, 5—5, and 6—6 of Fig. 2.

Although the reel mounting of the invention is shown and described with respect to its use in a double plane loading type of motion picture camera, it should be understood that the reel mounting is equally useful in any other type of film handling apparatus containing a reel mounting or particularly a reel mounting for coaxially located flanged reels.

The motion picture camera forming an illustrative background for the invention comprises a casing 10 having a side wall 11 and lateral wall 12. A handle 13 and finder elements 14 and 15 are mounted upon the top portion of lateral wall 12 and a photographic objective 16 is detachably mounted to the front portion of lateral wall 12 by a removable mount 17. A film gate 18 and film advancing claw 19 are mounted within said casing 10. A spring motor 20 is placed within a sprocket drum 21 and drives a gear 22 which in turn drives a gear 23 and pulley 24 and a secondary gear train including gears 25, 26 and 27 rotating the disk 28 to which the film advancing claw 19 is eccentrically connected. The governor, not shown, is mounted on a shaft 29 which carries a gear 30 meshing with said gear 25. A housing cover 31 forms a bearing for one end of the governor shaft 29 and one end of the spring motor shaft 32 and guide rollers assemblies 33 are located adjacent the periphery of the sprocket drum 21.

The side wall 11 of casing 10 has a hollow boss 34, see Fig. 2, covered by a sleeve bushing 35. The spindle member 36 has a reduced portion 37 journaled in sleeve bushing 35 and has a threaded end 38 extending into the hollow boss 34. A pulley 39 is threaded onto the threaded end 38 of spindle member 36 and is encircled by a spring belt 40 which also encircles the pulley 25 driven by the aforementioned gear 23. As will be readily understood by those skilled in the art when the film handling and film driving mechanism of the camera are operated, the spring belt 40 will also be moved for rotating the spindle member 36 to take up the film on one of the reels thereon. The details of camera construction referred to are more completely shown and described in United States Letters Patent, No. 2,241,232, for a Film handling apparatus. A cover plate 41 encloses the spring belt 40 and a square sleeve 42 is mounted on sleeve bushing 35 for a purpose to be later described. However, as previously mentioned, the reel mounting about to be disclosed may also be used in other types of film handling apparatus. The spindle member 36 is hollow at its other end by reason of an axial bore 43 therein. Two series of circumferentially arranged transverse holes are provided in said spindle member 36. Holes 44 are transversely drilled centrally of spindle member 36 through a hollow portion thereof to constitute one series of circumferentially arranged holes, preferably about six such holes are provided, see Fig. 5. Holes 45 are also transversely provided through a hollow portion of spindle member 36 and constitute a second series of circumferentially arranged transverse holes which are only slightly axially displaced from the first mentioned series of holes 44.

A plunger 46 is axially inserted into the bore 43 of spindle member 36 and is provided with a notch 47 and an axial hole 48. A transverse pin 49 has a driven fit with the hollow portion of spindle member 36 and extends through the notch 47 in plunger 46, said notch 47 and pin 49 forming a stop means to limit the relative axial movement between spindle member 36 and plunger 46. A resilient means, such as a coil spring 50, has one end extending in the axial hole 48 in plunger 46 and has its other end bearing against the bottom of the axial bore 43. As a result, the plunger 46 is normally urged into the position shown in Fig. 2 with the lower wall of notch 47 bearing against pin 49 and with the end of plunger 46 extending beyond the end of spindle member 36. Nevertheless, pressure on the end of plunger 46 will move it against the action of coil spring 50 into the hollow portion of spindle member 36.

The plunger 46 is provided with two circumferentially arranged series of recesses corresponding in location to the circumferentially arranged series of holes 44 and 45 in spindle member 36. Recesses 51, preferably six in all, are countersunk into the periphery of plunger 46, see Figs. 2, 3 and 6 to form the series of recesses corresponding to the series of holes 44. Recesses 52 are countersunk into the plunger 46 in positions corresponding to the location of the transverse holes 45 in the spindle member 36. The stop means for plunger 46 is so arranged or the notch 47 is preferably of such axial length that when the plunger 46 is depressed to bring the upper wall of notch 47 against pin 49, the recesses 51 and 52 in plunger 46 are respectively opposite the holes 44 and 45 and/or the ball members therein.

Ball members are placed in each of the transverse holes of the spindle member 36. For instance, ball members 53 are placed in the transverse holes 44 which holes are restricted in any suitable manner at the surface of the spindle member so that the balls cannot fall out. For instance, after insertion of a ball member 53 into a hole 44 and operation of the plunger 46 to bring a recess 51 opposite such ball member 53, the outer surface of the spindle member 36 may be peened around the hole 44 by striking with a hollow punch to restrict the outer end of the hole 44. In a similar manner ball members 54 are placed in holes 45 which are also restricted at the outer surface of the spindle member. Again, such restriction at the surface of the spindle member may be accomplished by operating the plunger 46 to bring recesses 52 opposite the ball member 54 and peening the margins of the holes 45 as by striking with a hollow punch.

The film reels to be mounted on the reel mounting of the invention may comprise a supply film reel 55 having flanges 56 and 57, the flange 56 preferably being provided with a circular axial opening 58 of slightly larger diameter than that of spindle member 36 and flange 57 being provided with a square axial opening 59 fitting over the square sleeve 42. The take-up film reel 60 also has flanges 61 and 62, flange 61 being provided with a circular axial opening 63 and flange 62 being provided with a square axial opening 64.

The operation of the reel mounting according to the invention is as follows: When the reel mounting is empty or without reels the various parts of the mounting are in the positions shown best in Fig. 2. The first reel to be mounted, such as the supply film reel 55 is dropped over the spindle member 36 with flange 57 downwardly. The square axial opening 59 in flange 57 will strike against either series of ball members unless the plunger 46 has been depressed or axially displaced whereupon the recesses 51 are opposite ball members 53 and recesses 52 are opposite ball members 54 so that said ball members may recede into the spindle member 36, either by action of gravity or by the camming action of the edge of the axial opening in the reel flange, and the supply film reel 55 drops beyond the two series of ball members and the square axial opening in flange 57 fits over the square sleeve 42. As is well understood such square and round openings in the respective flanges in the reel are provided so that the reel can only be inserted in the proper position with respect to the spindle member. After the supply film reel 55 has been placed in position, the plunger 46 is released and coil spring 50 returns the plunger to the position shown and the circumferential surface of the plunger 46 engages and moves the ball members 53 and 54 to protrude from the surface of spindle member 36.

The take-up film reel 60 is then placed over the spindle member 36 with its flange 62 provided with the square axial opening 64 downwardly. The ball members 54, being held in protruding position by the plunger 46, enter into the corners of the square opening 64 in flange 62 to form a driving connection from spindle member 36 to take-up film reel 60. At the same time the series of ball members 53 engage the lower edge of flange 62 of reel 60 so as to keep the reels 55 and 60 separated from each other. Obviously, the series of ball members 53 will be located axially of the spindle member 36 so as to have their centers on a central plane between reels 55 and 60. Likewise, the series or pair of ball members 54 will be displaced from the series of ball members 53 so as to engage a flange of the film reel and form a driving connection thereto. In the form shown such driving series of ball members 54 are only slightly displaced from the series of separating ball members 53 and in fact the ball members 54 are in staggered relation to two of the ball members 53 in the form of the invention shown in order to get the slight axial displacement of the series of ball members required. This relative location of the ball members of the respective series is best shown in Fig. 3.

When it is desired to remove the film reels, reel 60 may be lifted from the spindle member 36 but plunger 46 must be depressed to permit ball members 53 and 54 to recede into the spindle member before the supply film reel 55 can be removed. Incidentally, by pressing the plunger 46 with the forefinger and grasping the flanges of the reel 55 between the thumb and middle finger of the hand, the reel 55 may be removed from spindle member 36 using only one hand of the operator. Thus it will be seen that the invention is extremely simple and rugged in construction and provides the utmost in convenience for the positioning and removal of reels which can be done by using only one hand of the operator.

Obvious variations of the invention such as different axial locations of either or both of the series of ball members are within the scope of the present invention. The present disclosure is merely illustrative and the ambit of the invention is defined in the claims which follow.

Having now particularly described my invention what I desire to secure by Letters Patent of the United States and what I claim is:

1. A reel mounting comprising a spindle member adapted to support a reel thereon and provided with an axial bore and a transverse hole restricted at the outer surface of said spindle member, a ball member within said hole, and a cylindrical plunger movable to at least two positions within said spindle member and making a sliding fit with the wall of the bore therein, having a surface parallel to the direction of plunger movement and adapted in one position of said plunger positively to hold said ball member in a protruding position to engage a reel, and provided with a recess which in another position of said plunger is opposite said ball member to permit it to recede into said spindle member for reel removal.

2. A reel mounting comprising a spindle member provided with an axial bore, adapted to support a flanged reel having a polygonal central aperture in one flange thereof, and provided opposite the supported position of the polygonally apertured flange of said reel with a plurality of transverse holes which are restricted at the outer surface of said spindle member, a ball member within each of said holes, and a cylindrical plunger movable to at least two positions within said spindle member and making a sliding fit with the wall of the bore therein, the cylindrical surface of said plunger being adapted in one position of the plunger positively to hold said ball members to protrude from said spindle member for driving engagement with one of said reels, and provided with a plurality of recesses arranged to correspond to said holes and which recesses in another position of said plunger are opposite said ball members to permit them to recede into said spindle member for reel removal.

3. A reel mounting comprising a hollow spindle member adapted to support a pair of reels coaxially thereon and provided with two circumferentially arranged series of transverse holes each restricted at the outer surface of said spindle member, a ball member within each of said holes, and a plunger within said spindle member and provided with two circumferentially arranged series of recesses corresponding to said holes, movable to engage all of said ball members and move them to protrude from said spindle member, the ball members protruding from one series of holes separating said reels and the ball members protruding from the other series of holes for driving engagement with one of said reels, and said plunger being movable to bring said recesses opposite said ball members to permit them to recede into said spindle member for reel removal.

4. A reel mounting comprising a hollow spindle member adapted to support a pair of reels coaxially thereon and provided with two circumferentially arranged series of transverse holes each restricted at the outer surface of said spindle member, a ball member within each of said holes, a plunger within said spindle member and provided with two circumferentially arranged series of recesses corresponding to said holes, stop means between said spindle member and plunger for limiting the relative axial movement therebetween, and resilient means between said spindle member and plunger and normally urging said plunger to engage all of said ball members and move them to protrude from said spindle member for reel engagement, said plunger being movable against the action of said resilient means to bring said recesses opposite said ball members to permit them to recede into said spindle member for reel removal.

GUSTAVE F. ALDINGER.